US008898462B2

(12) United States Patent
Krummel et al.

(10) Patent No.: US 8,898,462 B2
(45) Date of Patent: Nov. 25, 2014

(54) METHOD AND DEVICE FOR AUTHENTICATING COMPONENTS WITHIN AN AUTOMATIC TELLER MACHINE

(75) Inventors: Volker Krummel, Paderborn (DE); Michael Nolte, Brakel (DE); Matthias Runowski, Salzkotten (DE)

(73) Assignee: Wincor Nixdorf International GmbH (DE)

( * ) Notice: Subject to any disclaimer, the term of this patent is extended or adjusted under 35 U.S.C. 154(b) by 94 days.

(21) Appl. No.: 13/379,990

(22) PCT Filed: Jun. 16, 2010

(86) PCT No.: PCT/EP2010/058480
§ 371 (c)(1),
(2), (4) Date: Dec. 21, 2011

(87) PCT Pub. No.: WO2011/003712
PCT Pub. Date: Jan. 13, 2011

(65) Prior Publication Data
US 2012/0102327 A1    Apr. 26, 2012

(30) Foreign Application Priority Data
Jul. 8, 2009   (DE) .................... 10 2009 032 355

(51) Int. Cl.
*G07F 19/00*   (2006.01)
*H04L 29/06*   (2006.01)
*H04L 9/30*    (2006.01)
*H04L 9/32*    (2006.01)

(52) U.S. Cl.
CPC .............. *G07F 19/206* (2013.01); *H04L 63/00* (2013.01); *G07F 19/20* (2013.01); *H04L 9/3073* (2013.01); *H04L 9/3247* (2013.01); *H04L 2209/56* (2013.01)
USPC ........................................................ 713/168

(58) Field of Classification Search
CPC ..................................................... H04L 63/00
USPC ......................................................... 713/168
See application file for complete search history.

(56) References Cited

U.S. PATENT DOCUMENTS

| 7,121,460 B1 | 10/2006 | Parsons et al. |
| 7,309,004 B1 | 12/2007 | Muschellack et al. |
| 7,957,536 B2 | 6/2011 | Nolte |
| 2004/0014982 A1 | 1/2004 | Hoefle et al. |
| 2009/0119221 A1 | 5/2009 | Weston et al. |

FOREIGN PATENT DOCUMENTS

| DE | 10 2006 049 518 A1 | 4/2008 |
| DE | 10-2008-060863 A1 | 6/2010 |
| EP | 1612747 A1 | 1/2006 |
| GB | 2401462 A | 11/2004 |
| WO | WO-2005/001629 A2 | 1/2005 |

OTHER PUBLICATIONS

Shamir, Adi, "Identity-Based Cryptosystems and Signature Schemes", Advances in Cryptology: Proceedings of CRYPTO 84, Lecture Notes in Computer Science, 1984, 7: pp. 47-53.
Boneh, Dan & Franklin, Matthew, "Identity-Based Encryption from the Weil Pairing", Advances in Cryptology-Proceedings of CRYPTO 2001, pp. 1-31.
Cocks, Clifford, "An Identity Based Encryption Scheme Based on Quadratic Residues", Proceedings of the 8$^{th}$ IMA International Conference on Cryptography and Coding, 2001, Communications-Electronics Security Group, Cheltenham, United Kingdom.
English Translation of the International Preliminary Report on Patentability (Chapter I of the Patent Cooperation Treaty) for PCT/EP2010/058480, issued Jan. 17, 2012; ISA/EP.
German Search Report (in German) for German Application No. 10 2009 032 355.4, dated Dec. 6, 2010.
Al-Riyami, S.S., Paterson, K.G., "Certificateless Public Key Cryptography", Advances in Cryptology—ASIACRYPT, 2003, pp. 1-40, XP002595551, DOI: 10.1007/b94617 (in English).
Joonsang Baek, Jan Newmarch, Reihaneh Safavi-Naini, Willy Susilo:, "A Survey of Identity-Based Cryptography", [Online] 2004, pp. 1-10, XP002595552, Proc. of Australian Unix Users Group Annual Conference, Retrieved from the Internet: URL:http://citeseerx.ist.psu.edu/viewdoc/download?doi=10.1.1.128.6502&rep=rep1&type=pdf> [retrieved on Aug. 5, 2008] (in English).
International Search Report for PCT/EP2010/058480 (in English), mailed Sep. 10, 2010; ISA/EP.
English translation of Chinese Office Action for Application No. 2010-80030567.3 dated Dec. 23, 2013 (14 pages).

*Primary Examiner* — Jacob Lipman
(74) *Attorney, Agent, or Firm* — Harness, Dickey & Pierce, P.L.C.

(57) ABSTRACT

The invention relates to a device and a method for authenticating components of an self-service automatic teller machine, wherein the components comprise unambiguous identification information that can be exchanged among the components, wherein an authentication of the components and/or the information exchanged between the components is carried out by the encryption and/or signature of the information on basis of identity based encryption (IBE) that uses the identification information of the components.

18 Claims, 2 Drawing Sheets

METHOD AND DEVICE FOR AUTHENTICATING COMPONENTS WITHIN AN AUTOMATIC TELLER MACHINE

CROSS-REFERENCE TO RELATED APPLICATIONS

This application is a National Stage of International Application No. PCT/EP2010/058480 filed Jun. 16, 2010, and published in German as WO/2011/003712 on Jan. 13, 2011. This application claims the benefit and priority of German application 10 2009 032 355.4, filed Jul. 8, 2009. The entire disclosures of the above applications are incorporated herein by reference.

BACKGROUND

This section provides background information related to the present disclosure which is not necessarily prior art.

1. Technical Field

Method for authenticating components of a self-service automat, wherein the components possess unambiguous identification information that can be exchanged among the components.

2. Discussion

Self-service automats often have a series of components that must be connected one with the other. Normally, these automats have a standardized PC platform that meets special security requirements. Keypads, cash payment units (bank note separation module), card readers, monitors and other devices are connected to this PC platform (motherboard), for example by way of USB interfaces. It must also be taken into account that money cassettes are inserted into automated teller machines (ATM) that must be authenticated, or the ATM must authenticate itself to the cassette so that said cassette activates its operational functions.

Furthermore, these automats include the potential to connect to another computer so that a maintenance technician, for example, can connect to the self-service automat using his laptop.

In the preferred embodiment, USB or other serial (V24) connections are used to connect the devices to each other.

There are instances in which a security-related component in a self-service automat, identified in what follows as an automated teller machine, is to be replaced. One such component could be a hardware module, such as a money cassette, or a software component, such as a firmware update, or peripheral devices as described above. It is critical in this process that the automated teller machine (PC) authenticate itself to the new component, or that the automated teller machine can check the authenticity of the component. The new component will perform its tasks only after successful authentication.

The following classic approaches for authentication are found in this scenario:
1) The component and the automated teller machine have a common confidential key. In this case, key administration is either very complex, or the same key is used for a plurality of automated teller machines.
2) The component itself is signed by a CA (certificate authority) or possesses information that allows it to check digital signatures or certificates. In this instance also, a classic PKI (public key infrastructure) must be administered.

SUMMARY OF THE INVENTION

An object of the invention is to prepare alternative authentication that is free of the disadvantages of the approaches described above.

The invention describes a new approach to the problems enumerated above. The approach of the invention is based on a skillful application of identity-based encryption (IBE). In this, public, unambiguous information, such as a serial number, is used as public keys. The automated teller machine, furnished with all the necessary parameters, asks for the public information about the component. With the assistance of the parameters, said automated teller machine can generate a signature from this information that can check the component using said component's public information. This method can also be combined with a challenge-response procedure, counters, or other methods to prevent replay attacks.

Reference is made to the appended literature for the basics of IBE. As the description Identity Based Encryption (IBE) makes clear, IBE encryption is encryption that is based on the identity of the user or the device. IBE encryption does not use any cryptic number keys in the encryption, but the identity of a recipient. The advantage in this is that the recipient does not need to remember a long number code, but rather can use an agreed upon identity characteristic such as his birthday, telephone number or his e-mail address as the public key. This technique, in which the message is encrypted using an identity, dispenses with key administration.

The basic approach is that a central office, "private key generator (PKG or CA)", generates a private and a public key (skPKG, pkPKG). The pkPKG key is made available to everyone. The recipient of the encrypted message is given a private key "skidempf", based on his identity "empf". The sender knows the identity of the recipient and encrypts the message using empf and pkPKG. This message can then be decrypted by means of skidempf. The current approaches are based on elliptical curves. Reference is made to the literature mentioned for details. Naturally, it is clear that this approach can also be used for the signature of information. For this, the data are signed with the private key and the signature is checked using the identity and the public key (empf, pkPKG).

When using the present invention, two components within the self-service automat check each other using an identity that can be ascertained. For example, the serial number, network number (MAC) or other unambiguous identity codes are ideal choices as an identity. There must be fundamental agreement on the choice of a code.

Now, using the identity and the keys, encryption or, in the preferred embodiment, signing can take place so that the components can be authenticated.

In signing, component B, for example, receives a serial number from component A. Component A sends a defined message that is signed (using a private key derived from the serial number) to component B. Component B, which knows the serial number and the public key, can now check the signature. One approach consists, as an example, in the signature of the serial number.

In an alternative embodiment, a known piece of information is encrypted. For this, it can be the serial number itself. Component B transmits its serial number to device A. Device A encrypts a message, for example the serial number itself, using the public key and the serial number, and transmits the encrypted message to component B, which decrypts the message and checks whether the decrypted message agrees with its own current serial number.

In a preferred embodiment, a counter is transmitted in addition to the serial number that is incorporated into the encrypted/signed information. If the counter is correct, said counter is incremented so that double use of a message can be prevented.

It must be noted that the components have to consist not only of hardware, an exchange of software can also be involved, where the software that is exchanged is signed or encrypted.

In a possible further approach, a server administers the private key for each client and signs the messages that said server sends to a client using the client's particular private key. The client in turn can check the signature since he knows his public verification key implicitly by using his identification and the public, global key. It is also conceivable that the public key is integrated directly into the identification so that there is no need for access or to deposit the public key. By combining these two pieces of information, access to the public key can be prevented. In this respect it is a reverse method of using asymmetric encryption since the client does not "know" his private key. This variation offers logistical advantages under certain circumstances since the clients can be personalized using exactly the same data.

The server mentioned can be operated in one embodiment directly in the ATM as a "small" CA.

If a new cassette/money cassette or component is to be operated in the device, the cassette should be capable of checking the authenticity of the ATM. There should be no exchange of private keys for this purpose.

The new cassette can derive its own public key and can thus check the message from the ATM which said ATM, using the private key of the cassette that it knows since it is a CA, and can derive said key in the IBS (identity based signature). In this case, the signature is used for the cassette, where the cassette is capable of deriving its own public key using its own identity and the general public key in order to check the signature.

If the check is successful, the cassette can assume that it is in the correct device, or in the correct group of devices.

A "challenge-response" method can also be used. If, for example, the serial number of one of the components is requested, a correct response must be given. A known approach is also the use of passwords that can be exchanged in advance. Thus, a password can be requested, for example, when the serial number is requested.

A number of advantages result.
1. The solution simplifies key administration and avoids the use of a complex PKI.
2. Signatures are individual for each authentication and consequently cannot be misused because they are not transferable to other authentication processes.
3. The solution is resistant to attacks using known messages.
4. The components do not need to be customized using confidential information.
5. The solution can be implemented on systems with limited resources, such as money cassettes, smartcards, etc.

BRIEF DESCRIPTION OF THE DRAWINGS

The Figures to which the following detailed description refers are described hereinafter.

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION OF THE PREFERRED EMBODIMENTS

Example embodiments will now be described more fully with reference to the accompanying drawings.

Figure 1:
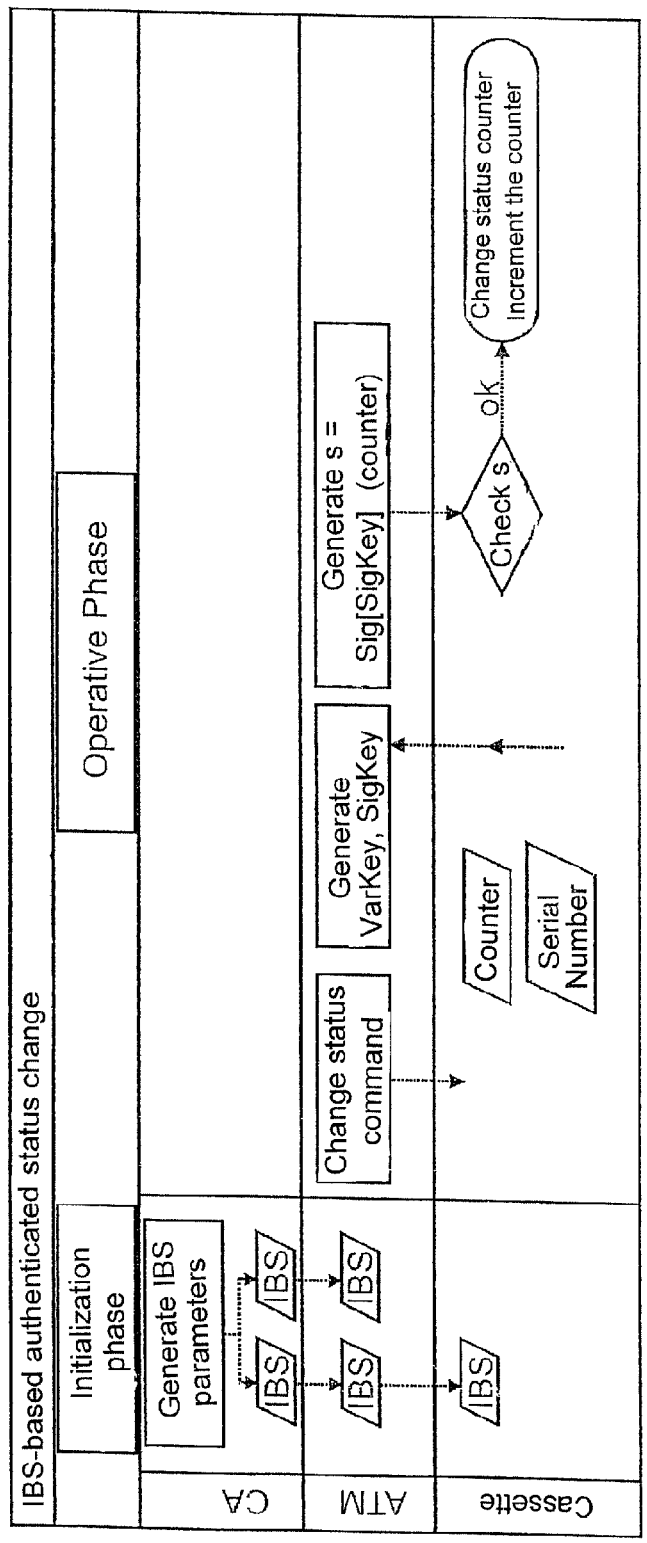
FIG. 1 shows a layer model for authentication, having a CA (certificate authority), an automated teller machine (ATM) and a money cassette, where the cassette authenticates the automated teller machine in order to disburse money.

FIG. 1 shows a layer illustration of the present invention. The CA, which is in possession of the two master keys, generates a public key IBSp, which is accessible to all components, and a private key IBSs for each component that is generated by the master key, taking into account the serial number of the component. The private key, since it was generated on the basis of the ATM serial number, is transmitted only to the ATM, the public key is transmitted to all components. The CA preferably administers the private keys of the ATMs, and the ATMs the private keys of the money cassettes so that the private keys of the money cassettes are not distributed with the money cassettes. Using this approach, it is possible for the CAs to make software updates on the ATMs, and for the money cassettes or the ATMs to recognize the legitimacy of the money cassettes or the ATMs.

When the money cassette is inserted into the ATM, the money cassette can check whether a permissible ATM is involved. In an alternative embodiment, the reverse can also happen, i.e. the ATM checks the money cassette. So that the ATM generates a signed message, the content of said message can be checked by the money cassette, and both a counter and the serial numbers are exchanged. The ATM now signs the message consisting of counter and serial number with the IBSs key (alternatively, of course, encryption can take place based on the IBSp and the serial number) and sends this message to the cassette which then checks the message using the serial number of the ATM and the IBSp (during an encryption the private key of the cassette is employed, which is not shown).

If the check is successful, the counter is incremented and cassette function is activated.

Figure 2:
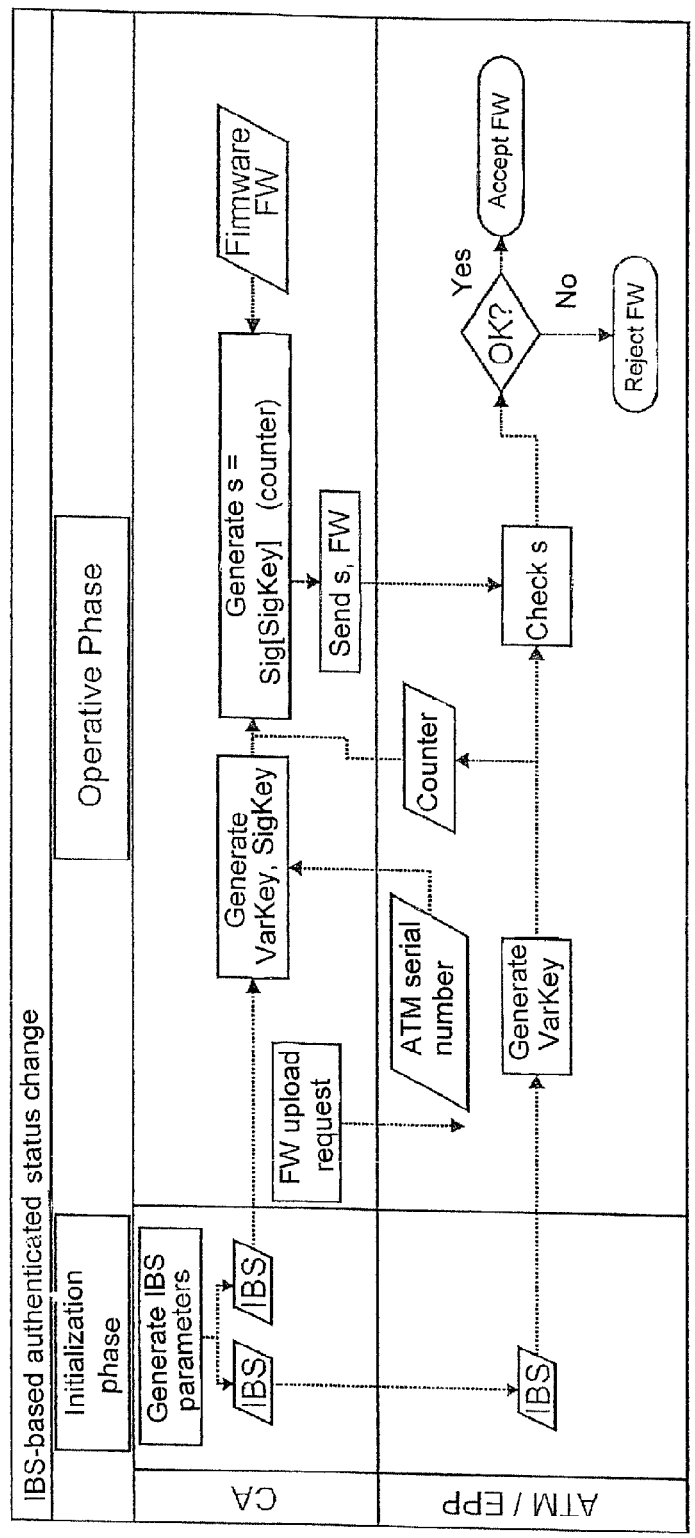
FIG. 2 shows a layer model for authentication having a CA and an automated teller machine, where signed firmware is transferred.

FIG. 2 shows an alternative embodiment of the present invention. The ATM is to receive new software. This software is prepared by the CA. A challenge-response method is shown in this example. The CA requests the ATM to download the software. The ATM then contacts the CA with the request to prepare the software. The CA makes its serial number and signed firmware available together with a previously communicated counter. The ATM checks the signature with the aid of the public key and the serial number of the CA. If the check of the signature and the counter was successful, an update of the ATM is performed. In the event of an error, the firmware is rejected.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed:

1. A method for authenticating components of an automated teller machine (ATM) self-service automat, wherein each of the components possess unambiguous identification information (empf), including at least one of a serial number, a bus code, and a network code that can be exchanged among the components, the method comprising:
   authenticating a first component of the components against a second component by using the identification information (empf) of the second component and a public key (pkPKG), information by encryption, and verification of a signature of the information on the basis of Identity Based Encryption (IBE) that uses the identification information of the components; and
   decrypting or generating a signature based on a private key (skidempf) that is derived from a private key (skPKG) and the identification information (empf) of the second component by the second component.

2. The method according to claim 1, wherein the first component is a money cassette to which the automated teller machine must authenticate itself before the money cassette commences operation with the automated teller machine.

3. The method from according to claim 1, wherein new software that is to be installed on the self-service automat is encrypted and/or signed by a central location in order to send said software to the self-service automat that decrypts the software and/or checks the signature before the software is installed.

4. The method according to claim 1, wherein a counter is additionally exchanged between the components that is taken into consideration in the signing or the encryption and is part of the signing or encryption.

5. The method according to claim 4, wherein the counter is incremented upon its successful authentication and thus the signed or encrypted information cannot be used multiple times.

6. The method according to claim 1, wherein a challenge-response method is additionally employed in advance of the signature or the encryption.

7. The method according to claim 6, wherein the challenge-response method is a password query before the identification information is prepared.

8. The method according to claim 1, wherein a central location administers private keys of the components and/or the self-service automats and forwards the encrypted information to said components and/or self-service automats.

9. The method according to claim 8, wherein the central location is arranged in the self-service automat and administers the private keys of the components so that the components can authenticate the self-service automat when said components are connected.

10. An automated teller machine (ATM) self-service automat comprising at least two components, wherein the components have a memory area in which unambiguous identification information (empf) is stored, the unambiguous identification information (empf) including at least one of a serial number, a bus code, and a network code that can be exchanged among the components, wherein a processing unit in a first component of the components is configured and equipped to authenticate a second component of the components using the identification information (empf) of the second component and a public key (pkPKG), information that is exchanged between the components by encryption, and verification of a signature of the information on the basis of Identity Based Encryption (IBE) and wherein the second component is configured to decrypt or generate a signature based on a private key (skidempf) that is derived from a private key (skPKG) and the identification information (empf) of the second component.

11. The self-service automat according to claim 10, wherein the first component is a money cassette, to which the automated teller machine must authenticate itself before the money cassette commences operation with the automated teller machine.

12. The self-service automat according to claim 10, wherein a counter is additionally filed in an additional memory area, said counter being exchanged between the components, being taken into consideration at the signing or the encryption and forming part of the signing or encryption.

13. The self-service automat according to claim 12, wherein the processing unit is configured and designed in such a way that the counter is incremented upon successful authentication and thus the signed or encrypted information cannot be used multiple times.

14. The self-service automat according to claim 10, wherein the processing unit is configured and designed in such a way that a challenge-response method is additionally employed in advance of the signature or encryption.

15. The self-service automat according to claim 14, wherein the challenge-response method is a password query before the identification information is prepared.

16. The self-service automat according to claim 10, wherein new software that is to be installed on the self-service automat is signed or encrypted by a central location in order to send said software to the self-service automat, wherein the processing unit is configured and designed in such a way that the software is encrypted and/or the signature is checked before the software is installed.

17. The self-service automat according to claim 16, wherein the central location administers the private keys of the components and/or the self-service automat and forwards the information in encrypted form to said components and self-service automat, and only the public keys can be determined on the components and/or the self-service automat to check the signature.

18. The self-service automat according to claim 17, wherein the central location is arranged in the self-service automat and administers the private keys of the components in a memory area so that the components can authenticate the self-service automat when said components are connected.

* * * * *